(12) United States Patent
Oyanagi et al.

(10) Patent No.: US 8,372,897 B2
(45) Date of Patent: Feb. 12, 2013

(54) INK COMPOSITION

(75) Inventors: Takashi Oyanagi, Matsumoto (JP); Kiyohiko Takemoto, Matsumoto (JP); Kazuaki Tsukiana, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 221 days.

(21) Appl. No.: 12/870,902

(22) Filed: Aug. 30, 2010

(65) Prior Publication Data
US 2011/0054088 A1  Mar. 3, 2011

(30) Foreign Application Priority Data

Aug. 31, 2009  (JP) .................................. 2009-199564

(51) Int. Cl.
*C09D 11/00* (2006.01)
(52) U.S. Cl. .......................... 523/160; 523/161; 524/111
(58) Field of Classification Search .................. 523/160, 523/161
See application file for complete search history.

(56) References Cited

U.S. PATENT DOCUMENTS

| 7,125,447 | B2 * | 10/2006 | Sugita et al. ............... 106/31.58 |
| 7,303,619 | B2 | 12/2007 | Oyanagi |
| 7,513,945 | B2 | 4/2009 | Nakano et al. |
| 7,604,693 | B2 | 10/2009 | Oyanagi et al. |
| 7,763,108 | B2 | 7/2010 | Oyanagi et al. |
| 2008/0145628 | A1 * | 6/2008 | Oyanagi et al. ............... 428/206 |
| 2008/0194754 | A1 | 8/2008 | Nakamura |

FOREIGN PATENT DOCUMENTS

| JP | 2002-179960 A1 | 6/2002 |
| JP | 2003-292836 A1 | 10/2003 |
| JP | 2003-306625 A1 | 10/2003 |
| JP | 2004-075889 A1 | 3/2004 |
| JP | 2006-016674 A1 | 2/2006 |
| JP | 2008-174712 A | 7/2008 |
| JP | 2008-208332 A | 9/2008 |

OTHER PUBLICATIONS

English Abstract of JP2002-179960A1 Published Jun. 26, 2002.
English Abstract of JP2003-292836A1 Published Oct. 15, 2003.
English Abstract of JP2003-306625A1 Published Oct. 31, 2003.
English Abstract of JP2004-075889A1 Published Mar. 11, 2004.
English Abstract of JP2008-174712A Published Jul. 31, 2008.
English Abstract of JP2008-208332A Published September 9, 2008.
Search Report for EPO Application No. 10173928.2-2102 Mailed Dec. 3, 2010.

* cited by examiner

*Primary Examiner* — Doris Lee
(74) *Attorney, Agent, or Firm* — Ladas & Parry LLP (57) ABSTRACT

An ink composition, contains: an organic solvent, a metal pigment, and a resin, in which the organic solvent contains, based on the total amount of the ink composition, 60% by mass or more of diethylene glycol diethylether, 24 to 37% by mass of γ-butyrolactone and/or tetraethylene glycol dimethyl ether, and more than 1% by mass and lower than 5% by mass of tetraethylene glycol monobutyl ether, and the 50% average particle diameter in terms of sphere determined by a light scattering method of the metal pigment is 0.8 to 1.2 μm.

12 Claims, 2 Drawing Sheets

INK COMPOSITION

TECHNICAL FIELD

The present invention relates to an ink composition and particularly relates to an ink composition capable of forming images having metallic gloss.

RELATED ART

Heretofore, in order to form a coating film having metallic gloss on printed matter, a foil stamp printing method using printing ink containing gold dust or silver dust produced from brass, aluminum particles, or the like as pigments or a metallic foil and a heat transfer system using a metallic foil have been used.

However, coating films formed using the printing ink containing gold powder or silver powder can obtain matte metallic gloss but have been difficult to obtain specular gloss because the average particle diameter of the metal powder to be used is as large as 10 µm to 30 µm. Moreover, the foil stamp or heat transfer using a metallic foil includes a process of applying an adhesive to a printing medium, pressing a smooth metallic foil onto the same to bring the recording medium and the metallic foil into close contact with each other, and heating the same to heat weld the metallic foil and the recording medium. Therefore, relatively favorable gloss can be obtained but the number of manufacturing processes increases and pressure or heat is applied in the manufacturing processes. Thus, the recording medium is limited to one that is resistant against heat or deformation.

In recent years, a large number of applications of ink jet in printing have been found, and metallic printing is mentioned as one example of the applications. For example, JP-A-2002-179960 discloses a technique of forming a metal film on the surface of plastic spherical particles, and printing using an ink composition containing a pigment thereof by ink jet printing (JP-A-2002-179960). However, in order to obtain high metallic gloss, it is necessary to change the spherical shape into a flat shape to smooth the surface. In this technique, press treatment with a roller and heat treatment need to be simultaneously performed. Accordingly, the device and the manufacturing process thereof inevitably become complicated in this respect and the recording medium thereof is also limited.

Moreover, JP-A-2003-292836 discloses a technique using an ink composition in which a precious metal colloid of gold, silver, or the like (JP-A-2003-292836 and JP-A-2003-306625). However, when the particle diameter of the precious metal colloid is reduced to several nm to several tens nm while giving priority to dispersion stability, coloring derived from plasmon absorption develops, and metallic gloss cannot be obtained as an ink composition. In this case, metallic gloss is obtained by drying a coating film, and then heat treating the same at a temperature of 150° C. or higher to sinter the colloidal particles. In addition, in the techniques, even when metallic gloss is obtained, it has been difficult to obtain high metallic specular gloss such that the specular gloss at 20°, 60°, and 85° exceed 200, 200, and 100, respectively, on an even and uniform surface. When the particle diameter is increased while giving priority to metallic gloss, the dispersion stability decreases, and thus a problem of aggregation or sedimentation cannot be avoided, resulting in the fact that the storage life of the ink composition sharply decreases.

The present inventors have proposed the technology disclosed in JP-A-2008-174712 as a pigment dispersion liquid, an ink composition, and the like that solve the problems.

According to the technique disclosed in JP-A-2008-174712, an excellent ink composition from the viewpoint of high metallic specular gloss can be provided but there is room for further improvement from the viewpoint of ink ejection stability in ink jet printing. Moreover, ink compositions containing metal pigments are easy to foam by shaking, and thus foams sometimes remain on printed images. Thus, the ink compositions containing metal pigments are also required to reduce foams remaining on printed images and further increase printing stability.

SUMMARY

An advantage of some aspects of the invention is to provide an ink composition containing a metal pigment and an ink composition having excellent ink ejection stability and printing stability.

In order to solve the problems, the present inventors have conducted extensive researches. As a result, the present inventors have found that excellent ink ejection stability and printing stability can be achieved by an ink composition using a metal pigment having a controlled particle diameter and a specific amount of a specific organic solvent. The invention has been made based on the finding and the following invention is provided.

(1) An ink composition, contains an organic solvent, a metal pigment, and a resin, in which the organic solvent contains, based on the total amount of the ink composition, 60% by mass or more of diethylene glycol diethylether, 24 to 37% by mass of γ-butyrolactone and/or tetraethylene glycol dimethyl ether, and more than 1% by mass and lower than 5% by mass of tetraethylene glycol monobutyl ether, and the 50% average particle diameter in terms of sphere determined by a light scattering method of the metal pigment is 0.8 to 1.2 µm.

(2) The ink composition according to (1) above, contains a surfactant having a concentration in the ink composition of 0.05 to 0.3% by mass.

(3) In the ink composition according to (2) above, the surfactant is an acetylene glycol surfactant and/or a silicone surfactant.

(4) In the ink composition according to any one of (1) to (3) above, the metal pigment is aluminum or an aluminum alloy.

(5) In the ink composition according to any one of (1) to (4) above, the metal pigment is produced by crushing a metal deposition film.

(6) In the ink composition according to any one of (1) to (5) above, the concentration of the metal pigment in the ink composition is 0.5 to 2.0% by mass.

(7) In the ink composition according to any one of (1) to (6) above, the resin is at least one member selected from the group consisting of polyvinyl butyral, cellulose acetate butyrate, and polyacryl polyol.

(8) In the ink composition according to (7) above, the resin is cellulose acetate butyrate.

(9) In the ink composition according to any one of (1) to (8) above, the concentration of the resin in the ink composition is 0.05 to 1.5% by mass.

The invention can provide an ink composition containing a metal pigment and an ink composition having excellent ink ejection stability and printing stability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Ink Composition

An ink composition of this embodiment contains a metal pigment, an organic solvent, and a resin described below.

The metal pigment according to this embodiment (hereinafter referred to as a "metallic pigment") has a 50% average particle diameter (d50) in terms of sphere determined by a light scattering method is 0.8 to 1.2 µm.

The 50% average particle diameter (d50) in terms of sphere determined by a light scattering method is measured and derived as follows. More specifically, the diffraction dispersion light generating by irradiating the particles in a dispersion medium is measured by disposing detectors at each portion of the front side, the lateral side, and the back side, and a point where the distribution curve of the cumulative percentage of the average particle diameter to be measured intersects the horizontal axis of the 50% cumulative percentage is defined as a 50% average particle diameter (d50). The average particle diameter in terms of sphere indicates an average particle diameter determined from measurement results, assuming that particles that are originally amorphous has a spherical shape. As a measuring device, a laser diffraction dispersion type particle size distribution measuring device LMS-2000e manufactured by Seishin Enterprise Co., Ltd., and the like are mentioned. Based on the fact that the 50% average particle diameter in terms of sphere (d50) determined by a light scattering method is in the range above, a coating film having high metallic gloss can be formed on printed matter and ink ejection stability from a nozzle also becomes high.

The metallic pigment is preferably one produced by crushing a metal deposition film and is preferably in the form of plate-like particles. When the metallic pigment is in the form of plate-like particles and the major axis, the minor axis, and the thickness on the plane of the plate-like particles are defined as X, Y, Z, respectively, the 50% average particle diameter R50 of the circle-equivalent diameter determined from the area of the X-Y plane of the plate-like particles is preferably 0.5 to 3 µm and the condition of R50/Z>5 is preferably satisfied.

The "plate-like particles" refer to particles having a substantially flat surface (X-Y plane) and having substantially uniform thickness (Z). Since the plate-like particles are produced by crushing a metal deposition film, metal particles having a substantially flat surface and a substantially uniform thickness can be obtained. Accordingly, the major axis, the minor axis, and the thickness on the plane of the plate-like particles can be defined as X, Y, Z, respectively.

The "circle-equivalent diameter" refers to, when the substantially flat surface (X-Y plane) of the plate-like particles of the metallic pigment is assumed to be a circle having the same projected area as the projected area of the particles of the metallic pigment, the diameter of the circle. For example, when the substantially flat surface (X-Y plane) of the plate-like particles of the metallic pigment is a polygon, the circle-equivalent diameter of the plate-like particles of the metallic pigment is the diameter of a circle obtained by converting the projected area of that polygon to a circle.

The 50%, average particle diameter R50 of the circle-equivalent diameter determined from the area of the X-Y plane of the plate-like particles is more preferably 0.5 to 3 µm and still more preferably 0.75 to 2 µm from the viewpoint of metallic gloss and printing stability. When the 50% average particle diameter R50 is lower than 0.5 µm, the gloss becomes insufficient. In contrast, when the 50% average particle diameter R50 exceeds 3 µm, the printing stability decreases.

From the viewpoint of securing high metallic gloss, the relationship between the 50% average particle diameter R50 of the circle-equivalent diameter and the thickness Z is R50/Z>5. When R50/Z is 5 or lower, there is a problem that the metallic gloss is insufficient.

The maximum particle diameter Rmax of the circle-equivalent diameter determined from the area of the X-Y plane of the plate-like particles is preferably 10 µm or lower from the viewpoint of preventing clogging of the ink composition in an ink jet recording device. When the Rmax is adjusted to be 10 µm or lower, clogging of a nozzle of an ink jet recording device, a mesh filter provided in an ink flow path, and the like can be prevented.

The metallic pigment is not particularly limited insofar as it has a function of metallic gloss or the like and is preferably aluminum or an aluminum alloy or silver or a silver alloy. Among the above, the metallic pigment is preferably aluminum or an aluminum alloy from the viewpoint of cost and securing high metallic gloss. In the case of using an aluminum alloy, other metallic elements or nonmetallic elements that can be added to aluminum are not particularly limited insofar as they have a function of having metallic gloss. As the metallic elements or nonmetallic elements, silver, gold, platinum, nickel, chromium, tin, zinc, indium, titanium, copper, and the like can be mentioned and at least one of the simple substances thereof, alloys thereof, and mixtures thereof are preferably used.

According to a method for producing the metallic pigment, the interface between a metal or alloy layer and a resin layer for separation of a composite pigment base material having a structure such that the resin layer for separation and the metal or alloy layer are successively laminated on a sheet-like base material is defined as the boundary, the metal or alloy layer is separated from the sheet-like base material, crushed, and pulverized, thereby obtaining plate-like particles. Among the obtained plate-like particles, particles having a 50% average particle diameter in terms of sphere (d50) determined by a light scattering method of 0.8 to 1.2 µm are fractionated. Or, when the major axis, the minor axis, and the thickness on the plane of the obtained plate-like particles are defined as X, Y, Z, respectively, particles in which the 50% average particle diameter R50 of the circle-equivalent diameter determined from the area of the X-Y plane of the plate-like particles is 0.5 to 3 µm and the condition of R50/Z>5 is satisfied are fractionated.

The major axis X, the minor axis Y, and the circle-equivalent diameter on the plane of the metallic pigment (plate-like particles) can be measured using a particle image analyzer. As the particle image analyzer, flow particle image analyzers FPIA-2100, FPIA-3000, and FPIA-3000S manufactured by SYSMEX CORPORATION can be utilized, for example.

The particle size distribution (CV value) of the metallic pigment (plate-like particles) is determined by the following equation.

$$CV\text{ value} = \text{Standard deviation of particle size distribution/Average particle diameter} \times 100 \quad \text{Equation 1}$$

The CV value obtained here is preferably 60 or lower, more preferably 50 or lower, and still more preferably 40 or lower.

By selecting a metallic pigment having a CV value of 60 or lower, the effect that the printing stability is excellent is obtained.

The metal or alloy layer is preferably formed by vacuum deposition, ion plating, or a sputtering method.

The thickness of the metal or alloy layer is preferably 5 nm or more and 100 nm or lower and more preferably 20 nm or more and 100 nm or lower.

Thus, pigments having an average thickness of preferably 5 nm or more and 100 nm or lower and more preferably 20 nm or more and 100 nm or lower are obtained. By setting the thickness to 5 nm or more, the reflectivity and brightness and the performance as the metallic pigment becomes high. By setting the thickness to 100 nm or lower, an increase in the appearance specific gravity can be suppressed so that the dispersion stability of the metallic pigment can be secured.

The resin layer for separation in the composite pigment base material is an under coat layer for the metal or alloy layer and is a separation layer for increasing the separation properties from the surface of the sheet-like base material. As resin for use in the resin layer for separation, for example, polyvinyl alcohol, polyvinyl butyral, polyethylene glycols, polyacrylic acid, polyacrylamide, cellulose derivatives, such as cellulose acetate butyrate (CAB), an acrylic acid polymer, and modified nylon resin are preferable.

The layer is formed by applying an aqueous solution of one member or a mixture of two or more members of the above-mentioned resins to a recording medium, drying, and the like. After the applications, additives, such as viscosity regulators, can be blended.

The application of the resin layer for separation is carried out by gravure coating, roll coating, blade coating, extrusion coating, dip coating, spin coating, or the like, which is generally used. After the application and drying, the surface is smoothed by calendar treatment as required.

The thickness of the resin layer for separation is not particularly limited, and is preferably 0.5 to 50 μm and more preferably 1 to 10 μm. When the thickness is lower than 0.5 μm, the amount as a dispersing resin is insufficient and when the thickness exceeds 50 μm, the layer becomes likely to be separated from a pigment layer at the interface when rolled.

The sheet-like base material is not particularly limited and polyester films, such as polytetrafluoroethylene, polyethylene, polypropylene, and polyethylene terephthalate, polyamide films, such as 66 nylon and 6 nylon, and mold release films, such as a polycarbonate film, a triacetate film, and a polyimide film, are mentioned. Preferable as the sheet-like base material is polyethylene terephthalate or a copolymer thereof.

The thickness of the sheet-like base materials is not particularly limited and is preferably 10 to 150 μm. When the thickness is 10 μm or more, there are no problems in the handling properties in the processes. When the thickness is 150 μm or lower, the softness is excellent and there are no problems in, for example, rolling and separation.

The metal or alloy layer may be sandwiched between protective layers as disclosed in JP-A-2005-68250. As the protective layer, a silicon oxide layer and a protective resin layer are mentioned.

The silicon oxide layer is not particularly limited insofar as the layer contains a silicon oxide and is preferably formed from silicon alkoxides, such as tetraalkoxysirane, or a polymer thereof by a sol-gel method.

A coating film of the silicon oxide layer is formed by applying an alcohol solution in which the silicon alkoxide or a polymer thereof has been dissolved, and heating and firing.

The protective resin layer is not particularly limited insofar as the resin does not dissolve in a dispersion medium. For example, polyvinyl alcohol, polyethylene glycol, polyacrylic acid, polyacrylamide, or a cellulose derivative is mentioned. The protective resin layer is preferably formed from polyvinyl alcohol or a cellulose derivative.

An aqueous solution of one member or a mixture of two or more members of the resins mentioned above is applied, and drying or the like is performed, thereby forming a layer. To the coating liquid, additives, such as viscosity regulators, can be blended.

The application of the silicon oxide and the resin is performed in the same manner as in the application of the resin layer for separation.

The thickness of the protective layer is not particularly limited and is preferably in the range of 50 to 150 nm. When the thickness is lower than 50 nm, the mechanical strength is insufficient. When the thickness exceeds 150 nm, the strength becomes excessively high and thus pulverization and dispersion become difficult and moreover the protective layer sometimes separates at the interface with the metal or alloy layer.

As disclosed in JP-A-2005-68251, a color material layer may be provided between the "protective layer" and the "metal or alloy layer".

The color material layer is introduced in order to obtain an arbitrary colored composite pigment and is not particularly limited insofar as a color material can be blended that can provide an arbitrary color tone and hue in addition to metallic gloss and brightness of the metallic pigment to be used in the invention. The color material for use in the color material layer may be a dye or a pigment. As the dye or pigment, known dyes or pigments can be used as appropriate.

In this case, the "pigment" for use in the color material layer refers to natural pigments, synthetic organic pigments, synthetic inorganic pigments, and the like as generally defined in the field of pigment chemistry, but is different from a pigment processed to have a multilayer structure, such as the "composite pigment" of the invention.

A method for forming the color material layer is not particularly limited, and the color material layer is preferably formed by coating.

When the color material for use in the color material layer is a pigment, the color material layer preferably further contains a color material dispersion resin. The color material dispersion resin is preferably produced by dispersing or dissolving the pigment and the color material dispersion resin and, as required, other additives, in a solvent, spin-coating the solution to form a uniform liquid film, and then drying the same to form a thin resin film.

In the production the composite pigment base material, the color material layer and the protective layer are preferably formed by coating from the viewpoint of working efficiency.

The composite pigment base material can have a layer structure having a plurality of multilayer structures in which the resin layer for separation, the metal or alloy layer, and the protective layer are successively laminated. The total thickness of the plurality of multilayer structures containing the metal or alloy layer, i.e., the thickness of the metal or alloy layer—the resin layer for separation—the metal or alloy layer or the resin layer for separation—the metal or alloy layer, excluding the sheet-like substrate and the resin layer for separation immediately above on the sheet-like substrate, is preferably 5000 nm or lower. When the total thickness is 5000 nm or lower, cracks or separation is hard to occur even when the composite pigment base material is rolled and the storage stability is excellent. Moreover, when formed into pigments, the pigments have excellent brightness and thus are preferable.

A structure such that the resin layer for separation and the metal or alloy layer are successively laminated on each surface of the sheet-like substrate is also mentioned, but the structure is not limited to the structures.

A method for separating the metal or alloy layer from the sheet-like base material is not particularly limited. Preferable is a method including injecting a liquid (solvent) to the composite pigment base material, scratching the metal or alloy layer of the composite pigment base material after the liquid is injected, and collecting the same, a method including performing the separation by immersing the composite pigment base material into a liquid, or a method including performing ultrasonic treatment simultaneously with immersion into a liquid, and then performing separation treatment and pulverizing treatment of the separated composite pigment. According to the methods, in addition to the separated metal or alloy layer, the liquid used for the separation treatment can also be collected. As the liquid (solvent) for use in the separation treatment, a glycol ether solvent, a lactone solvent, or a mixture thereof is mentioned, for example.

A method for crushing and pulverizing the separated metal or alloy layer is not particularly limited and may be a known method using a ball mill, a bead mill, an ultrasonic wave, a jet mill, or the like. Thus, the metallic pigment is obtained.

With the pigment obtained as described above, the resin layer for separation also serves as a protective colloid, and therefore a stable dispersion can be obtained simply by dispersing in a solvent. In an ink composition using the pigment, a resin derived from the resin layer for separation has a function of imparting adhering properties to a recording medium, such as paper.

The concentration of the metallic pigment in the ink composition is preferably 0.5 to 2.0 mass % when only one ink of an ink set is a metallic ink. When the concentration of the metallic pigment in the ink composition is 0.5% by mass or more and lower than 1.7% by mass, a glossy surface like a half mirror, i.e., glossy feeling, can be obtained by ejecting an ink with the amount that is not sufficient for covering a printing surface but printing in which the background is transparent can be achieved. By ejecting an ink with the amount that is sufficient for covering a printing surface, a metallic glossy surface having high gloss can be formed. Therefore, it is suitable for the case where half mirror images are formed on a transparent recording medium or the case of expressing a metallic glossy surface having high gloss, for example. Moreover, when the concentration of the metallic pigment in the ink composition is 1.7% by mass or more and 2.0% by mass or lower, the metallic pigment is randomly disposed on a printing surface, and thus high gloss cannot be obtained and a matte metallic glossy surface can be formed. Therefore, it is suitable for the case of forming a shielding layer on a transparent recording medium, for example.

As the organic solvent, a polar organic solvent, such as an alcohol (e.g., methyl alcohol, ethyl alcohol, propyl alcohol, butyl alcohol, isopropyl alcohol or fluorinated alcohol), a ketone (e.g., acetone, methyl ethyl ketone, or cyclohexanone), a carboxylate (e.g., methyl acetate, ethyl acetate, propyl acetate, butyl acetate, methyl propionate, or ethyl propionate), or an ether (e.g., diethyl ether, dipropyl ether, tetrahydrofuran, or dioxane) can be preferably used.

In particular, the organic solvent preferably contains one or more kinds of alkylene glycol ether which is a liquid under normal temperature and normal pressure.

The alkylene glycol ether includes ethylene glycol based ether or propylene glycol based ether containing, as a base, an aliphatic group, such as methyl, n-propyl, i-propyl, n-butyl, i-butyl, hexyl, or 2-ethyl hexyl, an allyl group having a double bond, or a phenyl group. The alkylene glycol ethers are colorless and have little odor. Since they have an ether group and a hydroxyl group in the molecule, they have the properties of both alcohols and ethers, and are liquid at normal temperature. Furthermore, the alkylene glycol ethers include monoethers in which only one of the hydroxyl groups has been substituted and diethers in which both the hydroxyl groups have been substituted, and a plurality of types thereof can be combined for use.

In particular, the organic solvent is preferably a mixture of alkylene glycol diether, alkylene glycol monoether, and lactone.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, and dipropylene glycol monoethyl ether.

Examples of the alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Examples of the lactone include γ-butyrolactone, δ-valerolactone, and ε-caprolactone.

The object of the present invention can be more effectively and certainly achieved by using such a favorable composition. In particular, a combination of diethylene glycol diethylether and γ-butyrolactone and/or tetraethylene glycol dimethyl ether, and tetraethylene glycol monobutyl ether is more preferable as a combination of the organic solvents.

When using such a combination as the organic solvent, the concentration of diethylene glycol diethylether in the ink composition is preferably 60% by mass or more, more preferably 65% by mass or more, still more preferably 70% by mass or more, and particularly preferably 70.1% by mass or more. The upper limit of the concentration is preferably 80% by mass, more preferably 75% by mass, and still more preferably 72% by mass. The total concentration of γ-butyrolactone and/or tetraethylene glycol dimethyl ether in the ink composition is preferably 24 to 37% by mass, more preferably 24 to 35% by mass, still more preferably 24 to 30% by mass, and particularly preferably 24 to 25% by mass. The concentration of tetraethylene glycol monobutyl ether in the ink composition is preferably more than 1% by mass and lower than 5% by mass and more preferably 2 to 4% by mass. Thus, the ink ejection stability and defoaming properties can be further improved.

Examples of a resin for use in the ink composition include acrylic resin, styrene-acrylic resin, rosin modified resin, terpene resin, polyester resin, polyamide resin, epoxy resin, vinyl chloride resin, a vinyl chloride-vinyl acetate copolymer, cellulose resin (e.g., cellulose acetate butyrate and hydroxy propyl cellulose), polyvinyl butyral, polyacryl polyol, polyvinyl alcohol, and polyurethane.

Moreover, nonaqueous emulsion type polymer particles (NAD=Non Aqueous Dispersion) can also be used as the resin. The NAD is a dispersion in which fine particles of, for example, a polyurethane resin, an acrylic resin, or an acrylic polyol resin are stably dispersed in an organic solvent.

Examples of the polyurethane resin include Sanprene IB-501 and Sanprene IB-F370 manufactured by Sanyo Chemical Industires, Ltd., and examples of the acrylic polyol resins include N-2043-60MEX manufactured by Harima Chemicals, Inc.

The resin emulsion is preferably added to the ink composition in a proportion of 0.1% by mass or more and 10% by mass or lower in order to further increase the fixability of the metallic pigment to a recording medium. An excessively large amount of the resin emulsion causes insufficient printing stability and an excessively small amount causes insufficient fixability. From the same viewpoint, the concentration of the resin in the ink composition is preferably 0.05 to 1.5% by mass, more preferably 0.1 to 1.0% by mass, still more preferably 0.15 to 0.35% by mass, and particularly preferably 0.15 to 0.25% by mass.

The resin in the ink composition is preferably at least one member selected from the group consisting of polyvinyl butyral, cellulose acetate butyrate, and polyacryl polyol and more preferably cellulose acetate butyrate. By using such a suitable composition, preferable effects of favorable scratch resistance during drying, fixability, and high metallic gloss can be acquired.

The ink composition preferably contains at least one glycerin, polyalkylene glycol, or saccharide. The total amount of the at least one glycerin, polyalkylene glycol, or saccharide is preferably 0.1% by mass or more and 10% by mass or lower in the ink composition. By using such a composition, ink ejection is stabilized while preventing the ink from drying and preventing clogging and the image quality of recorded matter can be made excellent.

The polyalkylene glycol is a linear polymer compound having a repetition structure of an ether bond in the main chain and is produced by, for example, ring opening polymerization of cyclic ether.

Specific examples of the polyalkylene glycol include a polymer, such as polyethylene glycol and polypropylene glycol, an ethylene oxide-propylene oxide copolymer, and derivatives thereof. As the copolymer, any copolymer, such as a random copolymer, a block copolymer, a graft copolymer, and an alternating copolymer, can be used.

Specific preferable examples of the polyalkylene glycol include one represented by the following formula.

$$HO-(C_nH_{2n}O)_m-H$$

(In the formula, n represents an integer of 1 to 5 and m represents an integer of 1 to 100.)

In the formula, $(C_nH_{2n}O)_m$ may be one fixed number or a combination of two or more kinds of numbers in the range of the integer value n. For example, when n is 3, the formula is $(C_3H_6O)_m$ and when n is a combination of 1 and 4, the formula is $(CH_2O-C_4H_8O)_m$. The integer value m may be one fixed number or a combination of two or more kinds of numbers in the range thereof. For example, in the example, when m is a combination of 20 and 40, the formula is $(CH_2O)_{20}-(C_2H_4O)_{40}$ and when m is a combination of 10 and 30, the formula is $(CH_2O)_{10}-(C_4H_8O)_{30}$. Furthermore, the integer values n and m may be arbitrarily combined in the range above.

Examples of the saccharide include monosaccharides, such as pentose, hexose, heptose, and octose, polysaccharides, such as disaccharides, trisaccharides, and tetrasaccharides, sugar alcohols that are derivatives thereof, reduced derivatives, such as deoxy acid, oxidized derivatives, such as aldonic acid and uronic acid, dehydrated derivatives, such as glycoseen, amino acids, and thiosugars. The polysaccharides refer to a wide range of saccharides, and include substances widely found in nature, such as alginic acid, dextrin, and cellulose.

The ink composition preferably contains at least one acetylene glycol surfactant and/or silicone surfactant. The surfactant is added in a proportion of preferably 0.05 to 0.3% by mass and more preferably 0.2 to 0.3% by mass based on the whole amount of the ink composition.

By using such a suitable composition, wetting properties of the ink composition to a recording medium are improved and prompt fixability can be obtained.

Preferable examples of the acetylene glycol surfactant include Surfinol 465 (Registered Trademark) and Surfinol 104 (Registered Trademark) (trade name, manufactured by Air Products and Chemicals and Inc.) and Olfine STG (Registered Trademark) and Olfine E1010 (Registered Trademark) (trade name, manufactured by Nissin Chemical Industry Co., Ltd.).

As the silicone surfactant, polyester modified silicone or polyether modified silicone is preferably used. Specific examples include BYK-347, BYK-348, BYK-UV3500, BYK-UV3570, BYK-UV3510, and BYK-UV3530 (BYK-Chemie Japan K.K.).

The ink composition can be prepared by known common methods. For example, the metallic pigment, a dispersant, and the organic solvent are mixed first, and a pigment dispersion is prepared using a ball mill, a bead mill, ultrasonic waves, a jet mill, or the like, as required. Then, the pigment dispersion is adjusted to have desired ink properties. Subsequently, a binder resin, the organic solvent, and other additives (e.g., dispersion aid or viscosity regulator) are then added to the pigment dispersion with stirring to obtain a pigment ink composition.

In addition to the above method, a composite pigment base material may be once treated with ultrasonic waves in a liquid solvent to obtain a composite pigment dispersion liquid, and then the composite pigment dispersion liquid may be mixed with a required liquid solvent for ink or a composite pigment base material can be treated with ultrasonic waves directly in a liquid solvent for ink to be used as an ink composition as it is. In order to adjust the solid content in the ink composition, known methods, such as pressure filtration and centrifugal separation, can also be used.

Although the physical properties of the ink composition are not particularly limited. For example, the ink composition preferably has a surface tension of 20 to 50 mN/m. When the surface tension of the non-aqueous ink composition is lower than 20 mN/m, the ink composition is spread over the surface of a printer head for ink jet recording or bleeds out from the head in some cases. As a result, the ejection of ink droplets becomes difficult in some cases. When the surface tension thereof exceeds 50 mN/m, the ink composition is not spread over the surface of a recording medium in some cases, and thus favorable printing cannot be performed in some cases.

Ink Set

An ink set of this embodiment contains two or more of the ink compositions and the ink compositions are different in the metallic pigment concentration.

It is preferable that, among the ink compositions, the concentration of the metallic pigment of at least one of the ink compositions be 0.5% by mass or more and lower than 1.0% by mass and the concentration of the metallic pigment of at least another one of the ink compositions be 1.0% by mass or more and 2.0% by mass or lower.

Recording Device

A recording device of this embodiment is an ink jet recording device having the ink set.

Figure 1:
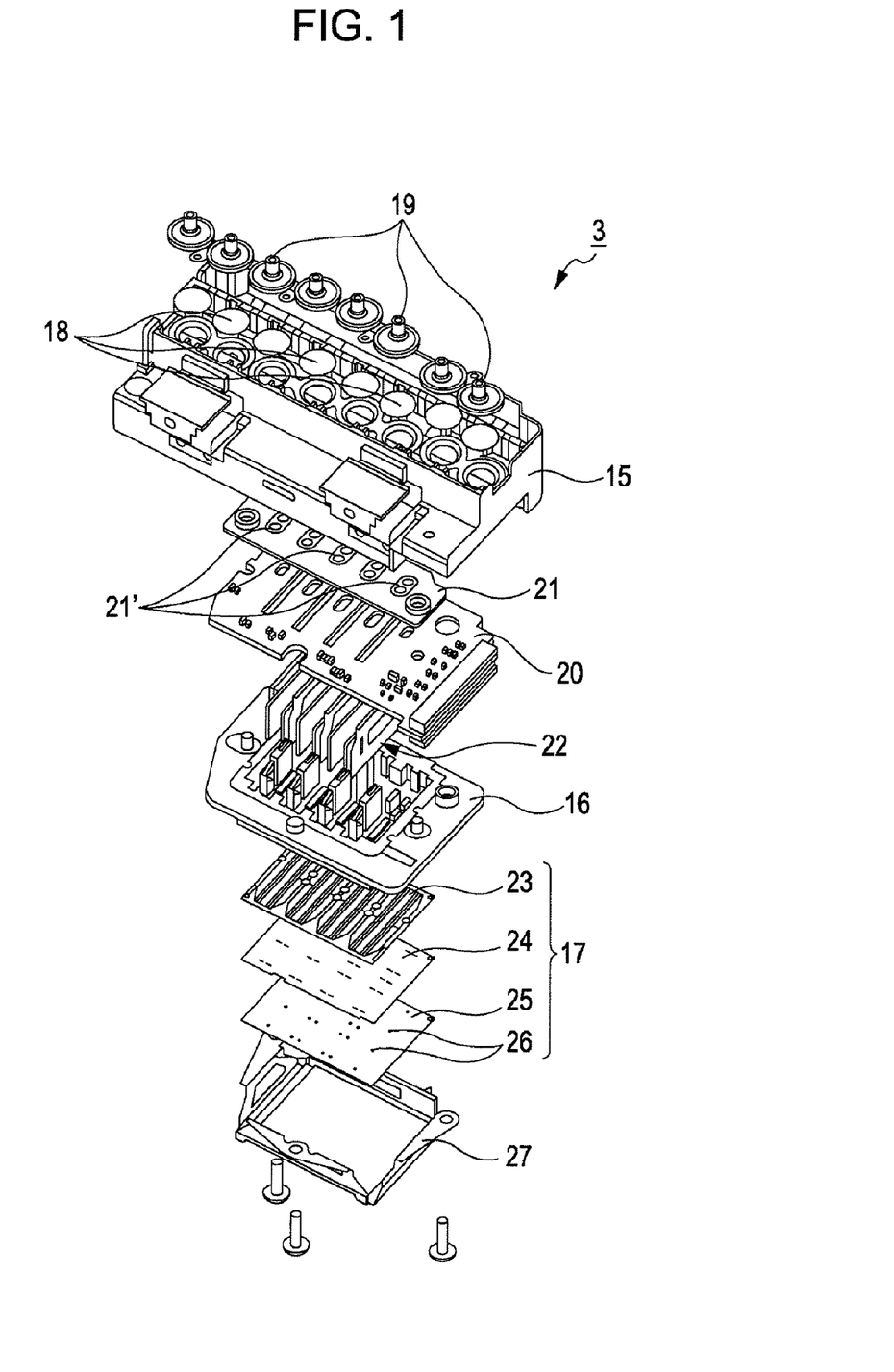
FIG. 1 is an exploded perspective view showing the structure of a recording head.
Figure 2:
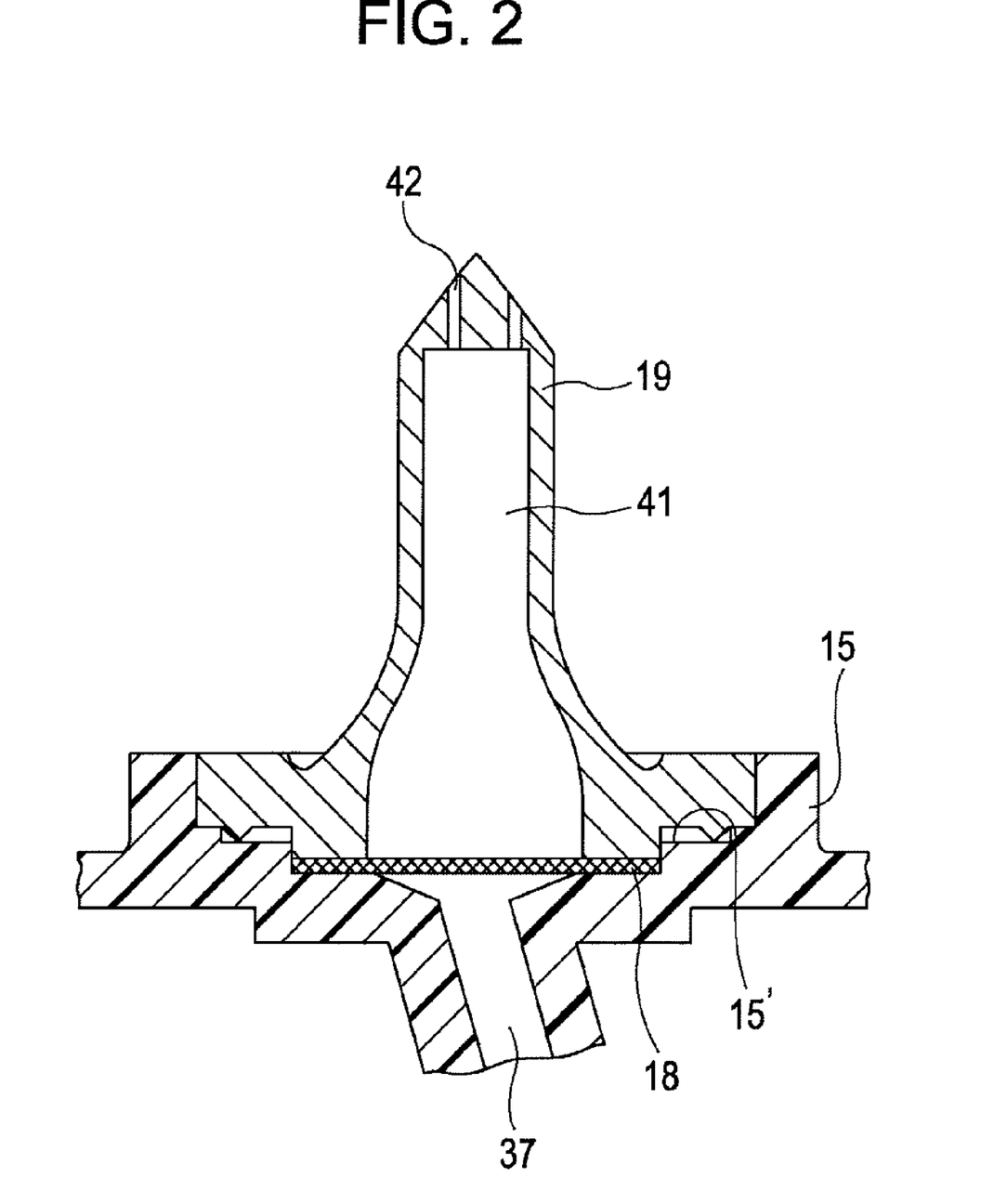
FIG. 2 is a cross sectional view showing the structure of an ink introduction needle.

Next, the structure of a recording head 3 of the ink jet recording device will be described. Here, FIG. 1 is a schematic perspective view of the recording head 3 to be accommodated in a carriage (not shown). FIG. 2 is a cross sectional view of an ink introduction needle 19 to be inserted into an ink cartridge.

The recording head 3 shown as an example has a cartridge base stand 15 (hereinafter referred to as a "base stand"). To the base stand 15, a head case 16 is attached. To the tip of the head case 16, a flow path unit 17 is attached (provided). The base stand 15 is molded with a synthetic resin and a plurality of partitions 15' (liquid storing member attaching portion) are provided on the upper surface.

To each partition 15', the ink introduction needle 19 is attached by placing a mesh filter 18 therebetween. To the partitions 15', an ink cartridge (not shown) is attached. More specifically, the ink cartridge is placed on the base stand 15. The details of the ink introduction needle 19 to be inserted into the ink cartridge will be described later.

To the other surface of the base stand 15 opposite to the partitions 15', a circuit board 20 is attached. The circuit board 20 is attached to the base stand 15 through a sheet member 21 functioning as a packing.

The head case 16 is fixed to the base stand 15 and is a casing for accommodating a vibrator unit 22 having a piezoelectric vibrator. Then, the flow path unit 17 is fixed with adhesives or the like to the tip surface opposite the surface, to which the base stand 15 is attached, of the head case 16. The flow path unit 17 is produced by successively laminating an elastic plate 23, a flow path formation substrate 24, and a nozzle plate 25, and fixing and unifying the same with adhesives or the like.

Here, the nozzle plate 25 is a plate-like member produced from, for example, a thin stainless steel plate and fine nozzle openings 26 are formed in a row at the pitch corresponding to the dot formation density of a printer. A head cover 27 is formed with a thin metal plate member, for example.

As shown in FIG. 2, the ink introduction needle 19 to be inserted into the ink cartridge is a hollow needle, the tip at the upper stream side of which is formed in to a conical shape and in which an ink introduction pass 41 is formed and the lower half portion thereof is tapered from the upper stream side to the lower stream side. To the tip of the ink introduction needle 19, an ink introduction opening 42 communicating the exterior space and the ink introduction path 41 is opened.

The ink introduction needle 19 is attached to the base stand 15 by, for example, ultrasonic welding, in the state where the mesh filter 18 is placed therebetween. Thus, the ink introduction path 41 of the ink introduction needle 19 and an ink communicating path 37 of the head case 16 communicate with each other.

Then, when the ink cartridge (not shown) is attached to the partitions 15' of the base stand 15, the ink introduction needle 19 is inserted into a needle insertion opening of the ink cartridge, so that the interior space of the ink cartridge and the ink introduction path 41 in the ink introduction needle 19 communicate with each other through the ink introduction opening 42. Thereafter, an ink stored in the ink cartridge is introduced into the ink introduction path 41 through the ink introduction opening 42 to be ejected from the nozzle openings 26 through the ink communicating path 37.

Here, when the diameter of the nozzle openings 26 of the recording head 3 of the ink jet recording device is adjusted to L µm and the opening of the mesh filter 18 provided in the ink introduction path 41 is adjusted to W µm, it is preferable that the nozzle diameter L µm and the opening W µm of the mesh filter satisfy the relationship of $L \geqq 5$ W. When the ink composition containing the pigment dispersion liquid of this embodiment is used for the ink jet recording device satisfying such a relationship, the following conditions are preferably satisfied from the viewpoint of preventing clogging of the metallic pigment in the nozzle openings 26 and securing the ejection stability of the ink composition. When the average particle diameter of the circle-equivalent diameter determined from the area of the X-Y plane of the plate-like particles is adjusted to R µm, it is preferable that the numbers of plate-like particles satisfying the conditions of $R > (L/5)$ constitute 5% or lower of the total numbers of the plate-like particles.

Ink Jet Recording Method

An ink jet recording method of this embodiment includes ejecting liquid droplets of the ink composition, and adhering the liquid droplets to a recording medium for recording.

From the viewpoint of angular dependence, it is preferable to form images having metallic gloss in which the measurement values of the specular glossiness at 20°, 60°, and 85° defined in JIS Z 8741 measured on the recording medium are simultaneously equal to or higher than 200, 200, and 100, respectively. The measurement values of the specular gloss at 20°, 60°, and 85° defined in JIS Z 8741 measured are more preferably simultaneously equal to or higher than 400, 400, and 100, respectively. The measurement values of the specular glossiness at 20°, 60°, and 85° defined in JIS Z 8741 are still more preferably simultaneously equal to or higher than 600, 600, and 100, respectively.

Images having metallic gloss in which the measurement values of the specular glossiness at 20°, 60°, and 85° defined in JIS Z 8741 are simultaneously 200 or more and lower than 400, 200 or more and lower than 400, and 100 or more, respectively, have flat (matte) metallic gloss.

Images having metallic gloss in which the measurement values of the specular glossiness at 20°, 60°, and 85° defined in JIS Z 8741 are simultaneously 400 or more and lower than 600, 400 or more and lower than 600, and 100 or more, respectively, have glossy metallic gloss so that objects reflected in the formed images can be slightly distinguished.

Images having metallic gloss in which the measurement values of the specular glossiness at 20°, 60°, and 85° defined in JIS Z 8741-1997 are simultaneously 600 or more, 600 or more, and 100 or more, respectively, have sharpness and has gloss so that objects reflected in the formed images can be clearly distinguished, i.e., so-called "specular gloss".

Thus, according to the ink jet recording method of this embodiment, by combining as appropriate the images having metallic gloss in which the measurement values of the specular glossiness at 20°, 60°, and 85° defined in JIS Z 8741 are simultaneously equal to or higher than 200, 200, and 100, respectively, images having desired metallic gloss from matte images to glossy images can be formed.

In contrast, when the measurement values of the specular glossiness at 20°, 60°, and 85° are not equal to or higher than 200, 200, and 100, respectively, metallic gloss is not observed in such images when visually observed and the images are observed as gray images. Moreover, when any of the measurement values of the specular glossiness at 20°, 60°, and 85° is not equal to or higher than the above-mentioned numerical values, the effects of the invention cannot be obtained.

The amount of the ink composition to be ejected onto the recording medium is preferably 0.1 to 100 mg/cm$^2$ and more preferably 1.0 to 50 mg/cm$^2$ from the viewpoint of securing metallic gloss, printing process, and cost.

The dry weight of the metallic pigment forming images on the recording medium is preferably 0.0001 to 3.0 mg/cm$^2$ from the viewpoint of metallic gloss, printing process, and cost. As the dry weight of the metallic pigment is lower, a metallic glossy surface having high gloss can be formed. Therefore, it is suitable for forming half mirror images on a transparent recording medium, for example. As the dry weight of the metallic pigment is higher, a matte metallic glossy surface can be formed. Therefore, it is suitable for forming a shielding layer on a transparent recording medium, for example.

As a method for ejecting the ink composition, the method described below is mentioned.

As a first method, an electrostatic suction system is mentioned. The system includes applying a strong electric field between a nozzle and an accelerating electrode placed in front of the nozzle, continuously injecting an ink in the form of liquid droplets from the nozzle, and giving a printing information signal to deflection electrodes during flying of the ink droplets between the deflection electrodes for recording or a system including injecting ink droplets corresponding to a printing information signal without deflection.

As a second method, a system is mentioned that includes applying pressure to an ink liquid with a small pump, and mechanically vibrating a nozzle with a crystal oscillator or the like to thereby forcibly inject ink droplets. The injected ink droplets are electrically charged simultaneously with injection, and a printing information signal is given to deflection electrodes during flying of the ink droplets between the deflection electrodes for recording.

A third method is a system using a piezoelectric element (a piezo element) in which recording is performed by simultaneously giving pressure and a printed information signal to an ink liquid with the piezoelectric element to inject ink droplets.

A fourth system is a system including rapidly expanding the volume of an ink liquid by the action of thermal energy in which recording is performed by heating the ink liquid to form bubbles using a micro electrode according to a printing information signal to inject ink droplets.

Any of the systems can be used for the ink jet recording method of this embodiment. From the viewpoint of achieving high-speed printing, the system for ejecting the ink composition is preferably a non-heating system. More specifically, the first, second, or third method is preferably employed.

The recording medium is not particularly limited and various recording media, such as a regular paper, an inkjet paper (mat paper and coated paper), glass, a plastic film such as vinyl chloride, a film having a base material coated with plastic or a receiving layer, metal, and a printed-circuit board, can be used.

When the recording medium has an ink receiving layer, it is preferable to perform printing on the recording medium in a non-heating manner from the viewpoint of not applying heat damages.

In contrast, when the recording medium does not have an ink receiving layer, it is preferable to perform printing on the recording medium by heating from the viewpoint of increasing a drying rate and obtaining high gloss.

Mentioned as a heating method are a method for heating a recording medium by bringing a heat source into contact with the recording medium, a method for heating a recording medium by emitting infrared rays, microwaves (electromagnetic waves having the maximum wave length around 2,450 MHz), or the like to the recording medium or blowing hot wind to the recording medium without contacting the recording medium, and the like.

The heating is preferably performed before printing and/or simultaneously with printing and/or after printing. In other words, the heating of the recording medium may be performed before printing, simultaneously with printing, or after printing and may be performed throughout printing. The temperature depends on the kind of the recording medium and is preferably 30 to 80° C. and more preferably 40 to 60° C.

According to the ink jet recording method of this embodiment, since the ink composition described above is used, excellent ink ejection stability and defoaming properties can be demonstrated.

Recorded Matter

Recorded mater of this embodiment is obtained by performing recording according to the ink jet recording method. Since the recorded matter is obtained using the ink set according to the ink jet recording method, the printing stability is excellent. Moreover, recorded matter having high metallic specular gloss can be obtained in which the specular gloss at 20°, 60°, and 85° indicate numerical values of 200, 200, and 100 or more, respectively. Moreover, since the metallic pigment concentration of the ink composition in the ink set varies in each ink composition, arbitrary metallic gloss from specular gloss to mat tone can be simultaneously formed.

EXAMPLES

1. Preparation of Metallic Pigment Dispersion Liquid

On a PET film having a film thickness 100 μm, a resin layer coating liquid containing 3.0% by mass of cellulose acetate butyrate (butyl content of 35 to 39%, manufactured by Kanto Kagaku) and 97% by mass of diethylene glycol diethylether (manufactured by Nippon Nyukazai Co., Ltd.) was uniformly applied by a bar coating method, and then dried at 60° C. for 10 minutes, thereby forming a thin film of a resin layer on the PET film.

Next, using a vacuum deposition device (vacuum deposition device model VE-1010, manufactured by Vacuum Device Inc.), an aluminum deposition layer having an average film thickness of 20 nm was formed on the resin layer.

Next, the laminate formed by the method was separated, pulverized, and dispersed at once in the diethylene glycol diethyl ether using a VS-150 ultrasonic disperser (manufactured by As One Corporation), and a metallic pigment dispersion 1 was formed by ultrasonically dispersing for 12 cumulative hours.

The obtained metallic pigment dispersion was filtered using an SUS mesh filter with 5 μm openings to remove coarse particles. Subsequently, the filtrate was poured into a round bottomed flask and the diethylene glycol diethyl ether was distilled off using a rotary evaporator. Thus, the metallic pigment dispersion was concentrated, and then the concentration of the metallic pigment dispersion was adjusted to obtain a metallic pigment dispersion 1 with a concentration of 5% by mass.

Subsequently, when the metallic pigment was measured for the 50% average particle diameter in terms of sphere (d50) determined by a light scattering method using a laser diffraction dispersion type particle size distribution measuring device LMS-2000e manufactured by Seishin Enterprise Co., Ltd, the 50% average particle diameter thereof was 1.001 μm.

2. Preparation of Metallic Pigment Ink Composition

Metallic pigment ink compositions were prepared according to the compositions shown in Table 1 and Table 2 using the metallic pigment dispersion 1 prepared by the method. After blending and dissolving a solvent and additives to form an ink solvent, the metallic pigment dispersion 1 was added to the ink solvent, and then blended and stirred using a magnetic stirrer for 30 minutes at normal temperature and normal pressure to obtain metallic pigment ink compositions (Examples 1 to 10 and Comparative Examples 1 to 8).

The diethylene glycol diethyl ether (DEGDE) and the tetraethylene glycol dimethyl ether (TEGDM) shown in Table 1 and Table 2 were manufactured by Nippon Nyukazai Co. Ltd. The γ-butyrolactone was manufactured by Kanto Kagaku. The tetraethylene glycol monobutyl ether (TEGMB) was manufactured by Nippon Nyukazai Co., Ltd. The cellulose acetate butyrate (CAB) was manufactured by Kanto Kagaku (butyl content of 35 to 39%) and the BYK-3500 (surfactant) was manufactured by BYK Japan. The units are % by mass.

TABLE 1

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| DEGDE | 65.15 | 64.95 | 69.95 | 70.05 | 70.10 | 85.15 | 84.95 | 74.95 |
| γ-butyrolactone | 15.00 | 15.00 | 10.00 | 10.00 | 10.00 | 5.00 | 5.00 | 10.00 |
| TEGDM | 15.00 | 15.00 | 15.00 | 15.00 | 15.00 | 5.00 | 5.00 | 10.00 |
| TEGMB | 3.00 | 3.00 | 3.00 | 3.00 | 3.00 | 3.00 | 3.00 | 3.00 |
| CAB | 0.35 | 0.35 | 0.35 | 0.35 | 0.35 | 0.35 | 0.35 | 0.35 |
| BYK-3500 | — | 0.20 | 0.20 | 0.10 | 0.05 | — | 0.20 | 0.20 |
| Metallic pigment (solid content) | 1.50 | 1.50 | 1.50 | 1.50 | 1.50 | 1.50 | 1.50 | 1.50 |
| Ejection stability | A | AA | AA | AA | A | B | B | B |
| Defoaming properties | A | A | A | A | A | A | A | A |

TABLE 2

|  | Ex. 6 | Ex. 7 | Ex. 8 | Ex. 9 | Ex. 10 | Comp. Ex. 4 | Comp. Ex. 5 | Comp. Ex. 6 | Comp. Ex. 7 | Comp. Ex. 8 |
|---|---|---|---|---|---|---|---|---|---|---|
| DEGDE | 70.40 | 70.10 | 70.35 | 70.45 | 71.15 | 51.15 | 37.15 | 70.85 | 72.15 | 68.15 |
| γ-butyrolactone | 10.00 | 10.00 | 10.00 | 10.00 | 12.00 | 22.00 | 29.00 | 10.00 | 10.00 | 10.00 |
| TEGDM | 15.00 | 15.00 | 15.00 | 15.00 | 12.00 | 22.00 | 29.00 | 15.00 | 15.00 | 15.00 |
| TEGMB | 3.00 | 3.00 | 3.00 | 3.00 | 3.00 | 3.00 | 3.00 | 0.50 | 1.00 | 5.00 |
| CAB | 0.20 | 0.20 | 0.25 | 0.15 | 0.15 | 0.15 | 0.15 | 0.15 | 0.15 | 0.15 |
| BYK-3500 | 0.20 | 0.20 | 0.20 | 0.20 | 0.20 | 0.20 | 0.20 | 0.20 | 0.20 | 0.20 |
| Metallic pigment (solid content) | 1.20 | 1.50 | 1.20 | 1.20 | 1.50 | 1.50 | 1.50 | 1.50 | 1.50 | 1.50 |
| Ejection stability | AAA | AAA | AAA | AAA | AAA | AA | A | B | B | B |
| Defoaming properties | A | A | A | A | A | B | C | A | A | B |

Various metallic pigment dispersion liquids were prepared in the same manner as in the preparation of the metallic pigment dispersion liquid 1, except variously changing the cumulative ultrasonic dispersion treatment time. Metallic pigment ink compositions (Examples 11 to 15, Comparative Examples 9 to 11) were prepared in the same manner as in Example 7, except using the various metallic pigment dispersion liquids in place of the metallic pigment dispersion liquid 1. The 50% average particle diameter in terms of sphere (d50) of the metallic pigment in the obtained metallic pigment ink compositions is shown in Table 3. The average particle diameter (d50) was measured using a laser diffraction dispersion type particle size distribution measuring device LMS-2000e manufactured by Seishin Enterprise Co., Ltd. Insofar as the metallic pigment was pulverized and dispersed as described above, the particle diameter was not reduced to be smaller than that of Example 11.

TABLE 3

|  | Ex. 11 | Ex. 12 | Ex. 13 | Ex. 14 | Ex. 15 | Comp. Ex. 9 | Comp. Ex. 10 | Comp. Ex. 11 |
|---|---|---|---|---|---|---|---|---|
| 50% average particle diameter d50 in terms of sphere (μm) | 0.899 | 0.925 | 1.054 | 1.117 | 1.154 | 1.252 | 1.333 | 1.775 |
| Ejection stability | AAA | AAA | AAA | AA | A | B | B | B |

3. Evaluation Test

(1) Ejection Stability

Examples 1 to 15, Comparative Examples 1 to 11

Using an ink jet printer SP-300V (manufactured by Roland D.G. Corporation), a black block was filled with the ink composition, and solid printing was performed at normal temperature on a recording medium manufactured by the same company, i.e., gloss vinyl chloride (with gray adhesive, Width of 610 mm and Length of 20 m) SV-G-610G.

The obtained solid printed image was visually observed for the presence of ejection defects (nozzle skipping), and the ejection stability was evaluated according to the following evaluation criteria. The "nozzle skipping" refers to the fact that ink to be ejected from a nozzle generally attached to a print head was not ejected due to nozzle clogging, thus affecting the printing results. The valuation criteria indicate that the ejection stability is evaluated in the order of AAA, AA, A, and B with the most excellent one being evaluated as AAA. The evaluation results are shown in Table 1, Table 2, and Table 3.

AAA: The occurrence of ejection defects (nozzle skipping) is not observed even when a rectangular solid image of 50 cm×200 cm size was printed once.

AA: The occurrence of ejection defects (nozzle skipping) is not observed even when a rectangular solid image of 50 cm×30 cm size was printed three times.

A: The occurrence of ejection defects (nozzle skipping) is not observed even when a rectangular solid image of 20 cm×30 cm size was printed three times.

B: The occurrence of ejection defects (nozzle skipping) is not observed even when a rectangular solid image of 20 cm×30 cm size was printed once but the occurrence of ejection defects (nozzle skipping) is observed in the second printing.

(2) Defoaming Properties

Examples 1 to 10, Comparative Examples 1 to 8

30 g of the ink composition was weighed in a glass sample container having an inner diameter of 37 mm, a height of 100 mm, and a capacity of 110 mL. Then, the sample container was sealed, and then shaked for 5 seconds, whereby the ink composition was stirred. The foams generated in the ink composition inside the sample container after shaking was visually observed, and the defoaming properties were evaluated in accordance with the following evaluation criteria. The evaluation criteria indicate that the defoaming properties are evaluated in the order of A, B, and C with the most excellent one being evaluated as A. The evaluation results are shown in Tables 1 and 2. When the defoaming properties in this test are excellent, the printing stability in high-speed printing is also excellent.

A: All the foams disappear within 1 minute after shaking.
B: All the foams disappear within 5 minutes after shaking.
C: The foams do not disappear even when 30 minutes passed after shaking.

The above results have clarified that the ink composition of the invention has excellent ejection stability from a nozzle of an ink jet printer and defoaming properties.

What is claimed is:

1. An ink composition, comprising:
   an organic solvent, a metal pigment, and a resin,
   the organic solvent containing, based on the total amount of the ink composition, 60% by mass or more of diethylene glycol diethylether, 24 to 37% by mass of a combination of γ-butyrolactone and tetraethylene glycol dimethyl ether with a ratio of γ-butyrolactone to tetraethylene glycol dimethyl ether in a range of 2:3 to 1:1, and more than 1% by mass and lower than 5% by mass of tetraethylene glycol monobutyl ether, and
   the 50% average particle diameter in terms of sphere determined by a light scattering method of the metal pigment being 0.8 to 1.2 μm.

2. The ink composition according to claim 1, wherein the metal pigment is aluminum or an aluminum alloy.

3. The ink composition according to claim 1, wherein the metal pigment is produced by crushing a metal deposition film.

4. The ink composition according to claim 1, wherein the concentration of the metal pigment in the ink composition is 0.5 to 2.0% by mass.

5. The ink composition according to claim 1, wherein the concentration of the resin in the ink composition is 0.05 to 1.5% by mass.

6. The ink composition according to claim 1, wherein the combination of γ-butyrolactone and tetraethylene glycol is present in an amount of 24-30% by mass with the γ-butyrolactone being present in an amount of 10% to 15% by mass.

7. The ink composition according to claim 1, comprising a surfactant having a concentration in the ink composition of 0.05 to 0.3% by mass.

8. The ink composition according to claim 7, wherein the surfactant is an acetylene glycol surfactant and/or a silicone surfactant.

9. The ink composition according to claim 1, wherein the resin is at least one member selected from the group consisting of polyvinyl butyral, cellulose acetate butyrate, and polyacryl polyol.

10. The ink composition according to claim 9, wherein the resin is cellulose acetate butyrate.

11. An ink composition, comprising:
    (a) an organic solvent comprising, based on a total amount of the ink composition, at least 60% by mass of diethylene glycol diethylether and 24 to 30% by mass of a combination of γ-butyrolactone and tetraethylene glycol dimethyl ether with the γ-butyrolactone being present in an amount of 10% to 15% by mass;
    (b) a metal pigment having a 50% average particle diameter in terms of sphere determined by a light scattering method of 0.8 to 1.2 μm; and
    (c) a resin;
    wherein the organic solvent further comprises tetraethylene glycol monobutyl ether in an amount of more than 1% by mass and less than 5% by mass that is effective to improve ejection stability of the ink composition as compared with the ejection stability of the ink composition with a lower or higher amount of the tetraethylene glycol monobutyl ether.

12. The ink composition according to claim 11, wherein, based on the total amount of the ink composition, the tetraethylene glycol monobutyl ether is present in an amount of 2-4% by mass.

* * * * *